United States Patent [19]

Manuel

[11] Patent Number: 5,319,829
[45] Date of Patent: Jun. 14, 1994

[54] COASTER WAGON HANDLE EXTENSION

[76] Inventor: James W. Manuel, 301 River La., Dearborn, Mich. 48124

[21] Appl. No.: 986,855

[22] Filed: Dec. 4, 1992

[51] Int. Cl.⁵ ............................................. B25G 3/24
[52] U.S. Cl. ............................ 16/114 R; 16/DIG. 25
[58] Field of Search ...... 16/114 R, DIG. 24, DIG. 25

[56] References Cited

U.S. PATENT DOCUMENTS

| | | | |
|---|---|---|---|
| 1,143,360 | 6/1915 | Chorvath | 16/114 R |
| 2,777,729 | 1/1957 | Nieratko | 16/114 R |
| 4,794,667 | 1/1989 | Nelson et al. | 16/114 R |

Primary Examiner—Lowell A. Larson
Assistant Examiner—Carmine Cuda
Attorney, Agent, or Firm—Peter D. Keefe

[57] ABSTRACT

A handle extension for a coaster wagon which allows an adult to easily control the handle thereof without having to bend and yet is quickly adaptable to any preselected shape of grip component of the handle, composed of an extension member for providing a length elongation of the tubular component of the handle of the coaster wagon, a connector member for connecting the extension member immovably to the grip component, and a hand grip for being held by the user of the coaster wagon, who may or may not be a full sized adult, but which is dimensioned to accommodate even the largest of adult sized hands. It is preferred for the extension member to be of a flat thin, elongated shape, terminating in an open hand grip. The connector member is releasably connected with the extension member at the end thereof opposite the hand grip. The connector member has one or more predetermined patterns for seatably fitting with respect to the included space formed by one or more preselected coaster wagon grip components, there preferably being two such patterns, one each for each of the two types of commonly used grip components.

6 Claims, 2 Drawing Sheets

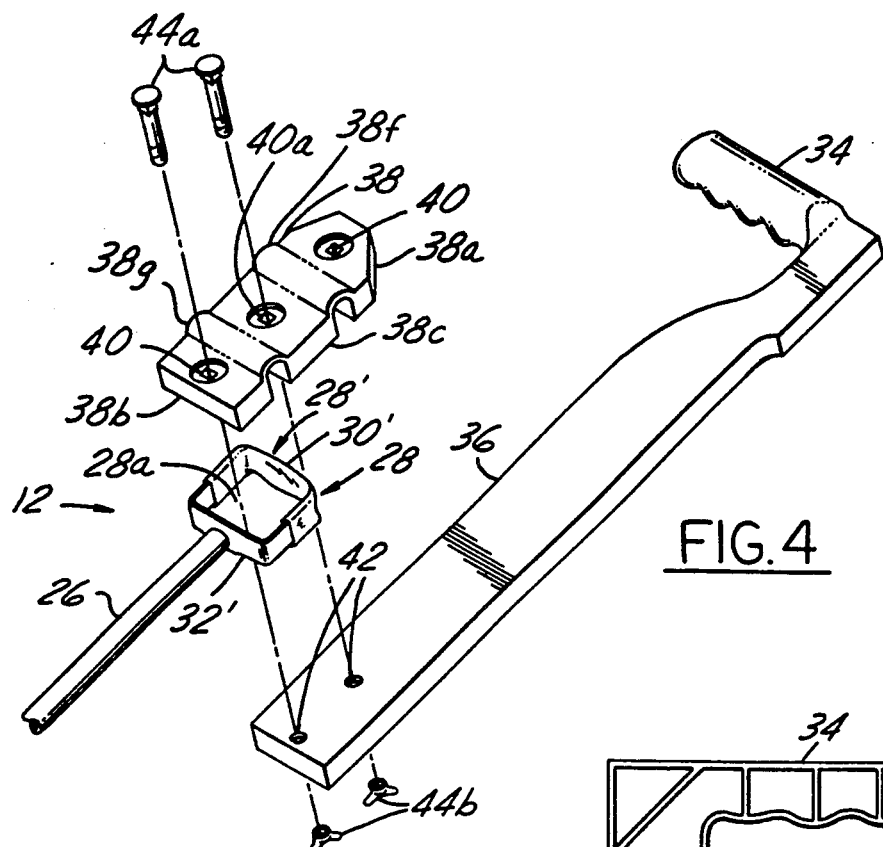
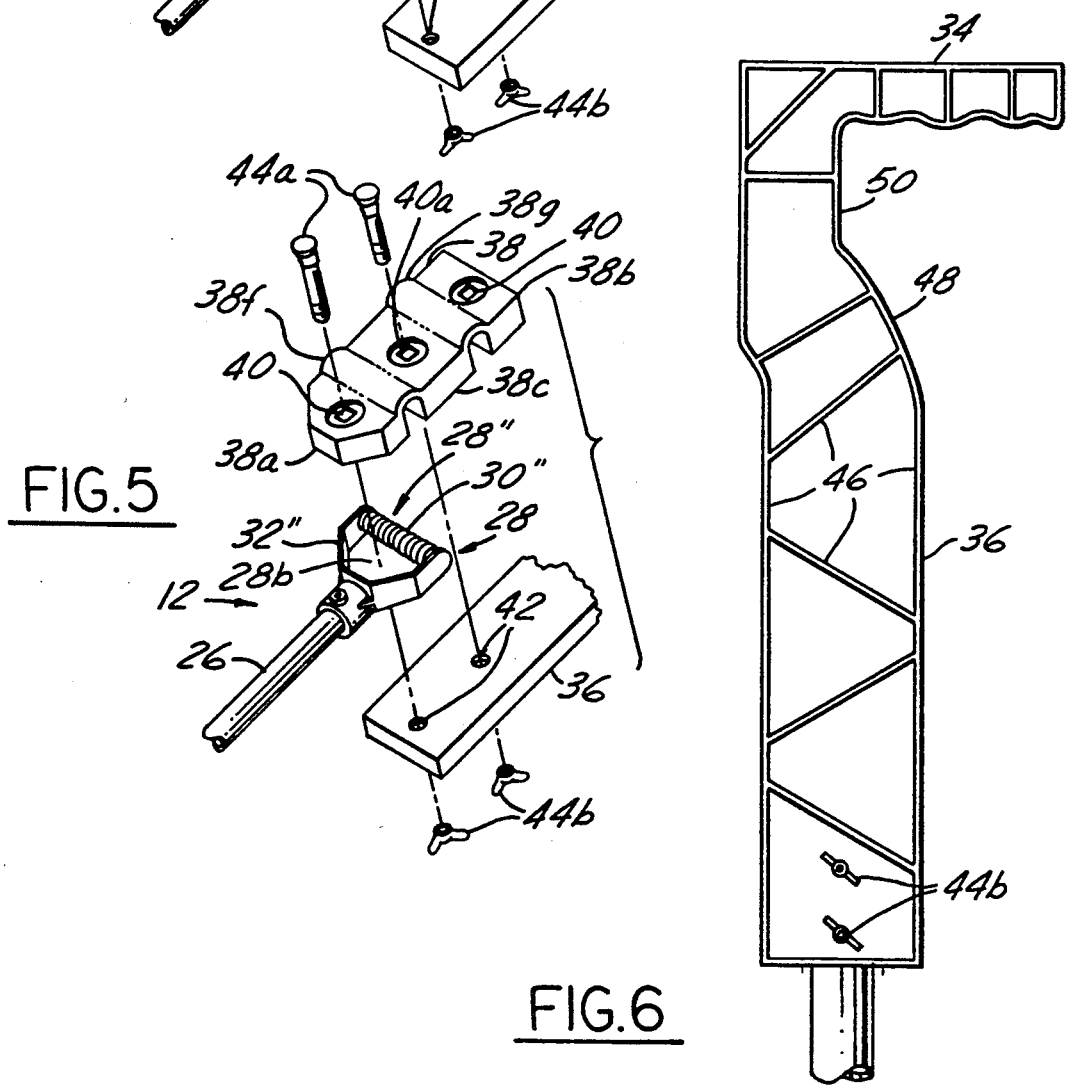

COASTER WAGON HANDLE EXTENSION

BACKGROUND OF THE INVENTION

1. Field of the Invention

The present invention is related to coaster wagons of the type used by children, and more particularly to the handle thereof. Still more particularly, the present invention is related to a device for extending the aforesaid handle so that a full sized adult person may use the handle with greater ease.

2. Description of the Prior Art

Coaster wagons used by children in their play are very well known in the art A coaster wagon is composed generally of a rectangularly shaped bed having an upstanding peripheral sidewall, four wheels mounted beneath the bed in which two are located near the front and are pivotable and two are located near the rear and are not pivotable, and a handle connected with the front wheels for providing pulling and pushing of the coaster wagon as well as steerage by causing selective pivoting of the front wheels via a front wheel assembly. The handle includes a tubular component which connects at a first end to the front wheel assembly and connects at the opposite, second end to a grip component. The grip component includes a handle grip for being clasped in the hand of the user and a bracket for connecting the handle grip to the second end of the tubular component.

Since coaster wagons are intended primarily as a child's toy, they are dimensioned for use by children, who are small sized people. This means that the tubular component of the handle is on the order of a little over two feet in length. Problematically for full sized adults, the handle length is too short to be held comfortably: The adult must bend down a bit and the wagon is too close to his or her heels. And, some larger sized adults may have a hand which is too large to comfortably fit inside the bracket of the grip component, so that it may be impossible for all their fingers to wrap around the handle grip.

Accordingly, what is needed in the art is some way of modifying the handle of a coaster wagon so as to accommodate a full size adult However, it must be further kept in mind that any solution to this problem must take into account the fact that there are two kinds of shapes of grip component used by the major coaster wagon manufacturers: 1) a cylindrically shaped handle grip mated with a V-shaped bracket, constructed of plastic; and 2) a curvably shaped handle grip mated with a U-shaped bracket, constructed of metal

SUMMARY OF THE INVENTION

The present invention is a handle extension for a coaster wagon which allows an adult to easily control the handle thereof without bending and yet is quickly adaptable to either kind of shape of grip component.

The handle extension according to the present invention is composed of an extension member for providing a length elongation of the tubular component of the handle of the coaster wagon, a connector member for immovably connecting the extension member to the grip component of the handle of the coaster wagon, and a hand grip for being held by the user of the coaster wagon, who may or may not be a full sized adult, but which is dimensioned to accommodate even the largest of adult sized hands.

With greater particularity, it is preferred for the extension member to be planar, that is, of a flat thin, elongated shape, terminating in an open hand grip. The connector member is releasably connected with the extension member at the end thereof opposite the hand grip. The connector member has one or more predetermined patterns for seatably fitting with respect to the included spaced defined by one or more preselected coaster wagon grip components, there preferably being two such patterns, one each for each of the two types of common grip components discussed hereinabove.

Accordingly, it is an object of the present invention to provide an extension for coaster wagon handles so that a full sized adult may use the handle without need for bending.

It is an additional object of the present invention to provide an extension for coaster wagon handles in which the handle member thereof accommodates any sized hand who may be using it.

It is another object of the present invention to provide an extension for coaster wagon handles which accommodates the two major types of coaster wagon grip components.

It is yet an additional object of the present invention to provide an extension for coaster wagon handles which accommodates the two major types of coaster wagon grip components, which accommodation is carried out easily.

It is another object of the present invention to provide an extension for coaster wagon handles which is inexpensive, effective and safe.

These, and additional objects, advantages, features and benefits of the present invention will become apparent from the following specification.

BRIEF DESCRIPTION OF THE DRAWINGS

FIG. 4 is an exploded perspective view of a handle extension being connected with a coaster wagon grip component of one type.

FIG. 5 is an exploded perspective view of a handle extension being connected with a coaster wagon grip component of another type.

FIG. 6 is a bottom view of the handle extension according to the present invention seen along arrow 6 in FIG. 2, showing a preferred reinforcing rib structure.

DETAILED DESCRIPTION OF THE PREFERRED EMBODIMENT

Figure 1:
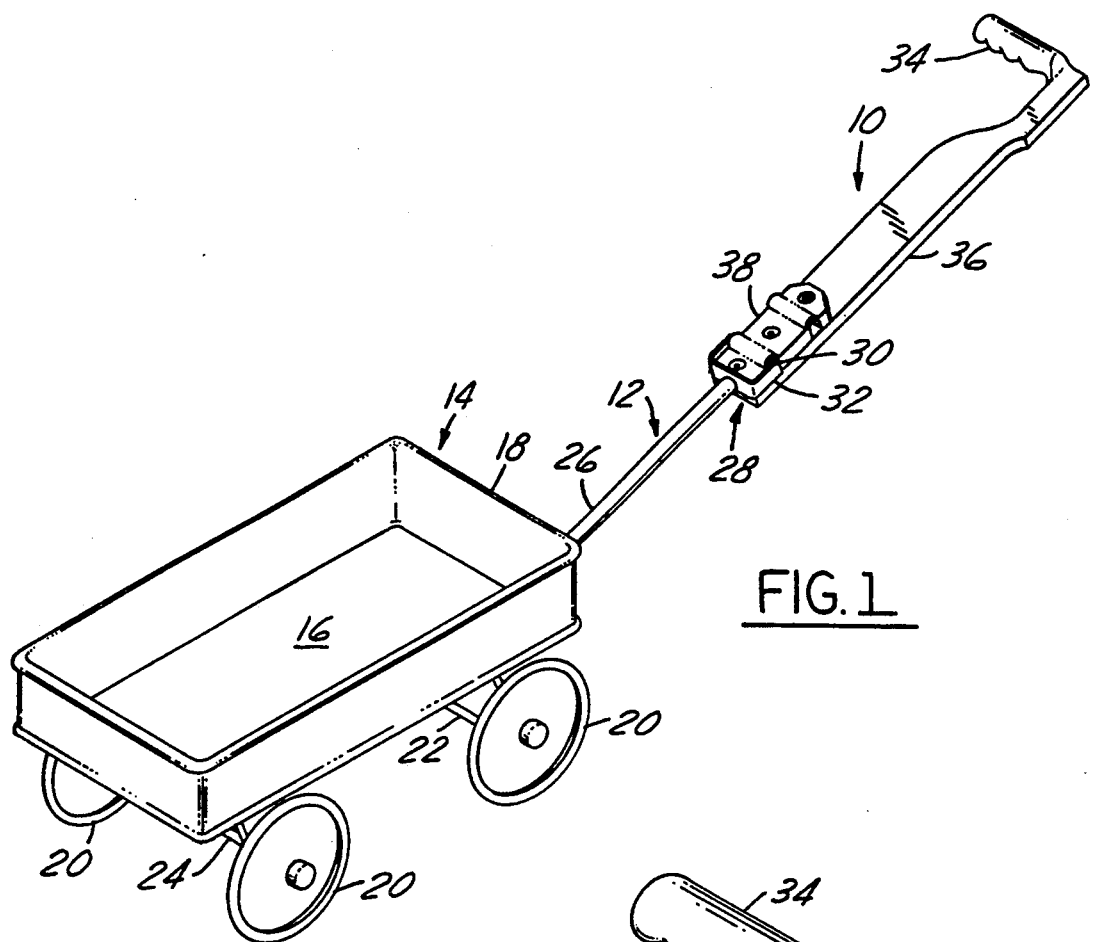
FIG. 1 is a perspective view of the handle extension according to the present invention, shown in operation in connection with a coaster wagon.

Referring now to the Drawing, FIG. 1 shows the handle extension 10 according to the present invention connected with the handle 12 of a coaster wagon 14.

The coaster wagon 14 is typically but not necessarily, composed of a rectangularly shaped bed 16 having an upstanding peripheral sidewall 18, the aforesaid handle 12, and four wheels 20 mounted in two sets of pairs beneath the bed, in which a first set 20a of pairs of wheels 20 is located near the front of the bed 16 so as to be pivotably connected thereto by a front wheel assembly 22, and a second set 20b of pairs of wheels 20 is located near the rear of the bed 16 and is non-pivotably connected thereto by a rear wheel assembly 24. The handle 12 includes a tubular component 26 which has a first end connected with the front wheel assembly 22 and a second end connected with a grip component 28. The handle 12 is ordinarily connected with the front wheel assembly 22 so that it may be vertically pivoted, but sideways movement thereof causes the first set 20a of pairs of wheels 20 to pivot therewith. The grip component 28 includes a handle grip 30 (see FIGS. 4 and 5) for being held in the hand of the user and a bracket 32 for connecting the handle grip to the second end of the tubular component 26.

More than one shape of grip component 28 is used in the coaster wagon art. Two examples of common shapes are shown in FIGS. 4 and 5. In FIG. 5, a first type 28' of grip component 28 is shown, having a cylindrically shaped handle grip 30' mated with a V-shaped bracket 32' thereby defining an included space 28a having a predetermined pattern. The first type 28' of grip component 28 is integrally constructed of plastic. In FIG. 5, a second type 28" of grip component 28 is shown, having a curvably shaped handle grip 30" mated with a U-bracket 32" thereby defining an included space 28b having another predetermined pattern. The second type 28" of grip component 28 is constructed of metal in which the U-shaped bracket is partly formed of crimped ends of the handle grip 30" spot welded thereto.

The handle extension 10 provides a length extension for the handle 12, as well as a hand grip 34 for the user to grab hold of. Referring now also to remaining FIGS. 2 through 6, the structure and function of the handle extension 10 will be detailed with greater specificity.

Figure 2:
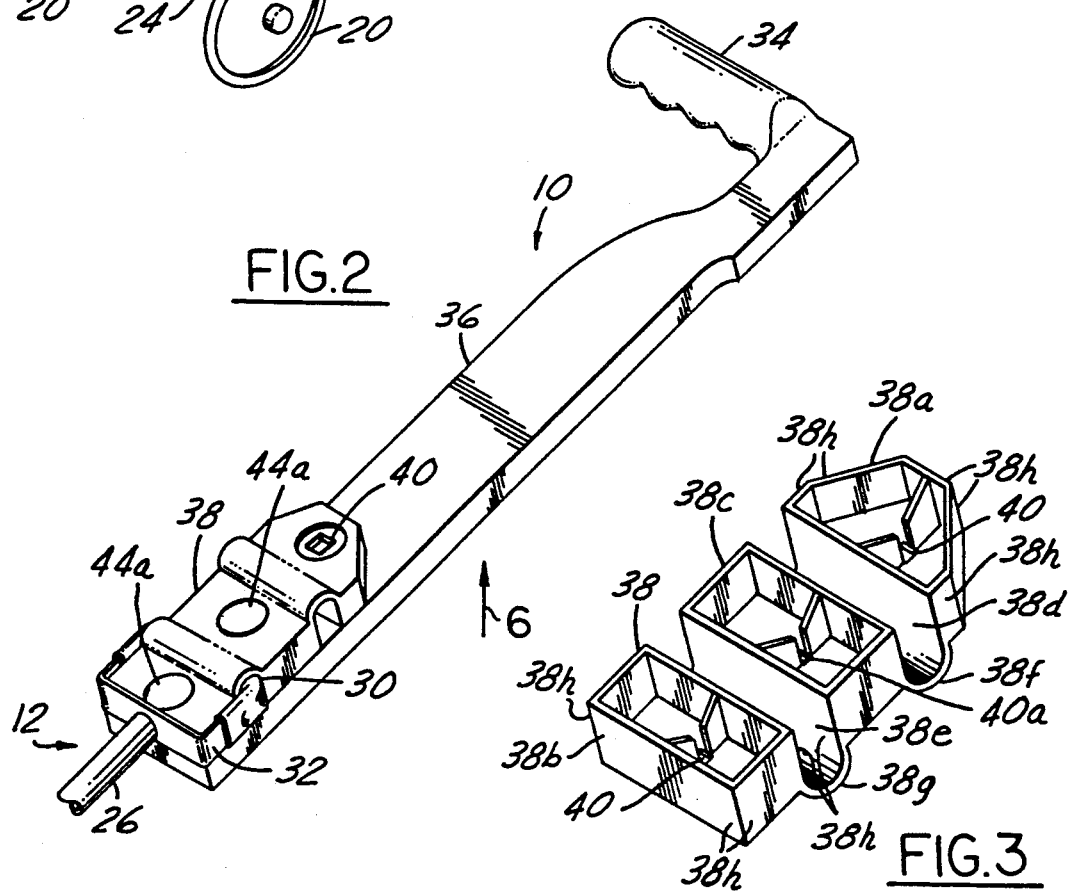
FIG. 2 is a closer view of the depiction of FIG. 1 showing in greater detail the connection of the coaster wagon grip component with respect to the handle extension according to the present invention.

As can be understood by reference to FIG. 2, the handle extension 10 is composed of three major parts: an extension member 36, the aforementioned hand grip 34 connected to one end of the extension member, and a connector member 38 for seatably receiving immovably the grip component 28 of the coaster wagon 14 at the other end of the extension member opposite the hand grip.

Figure 3:
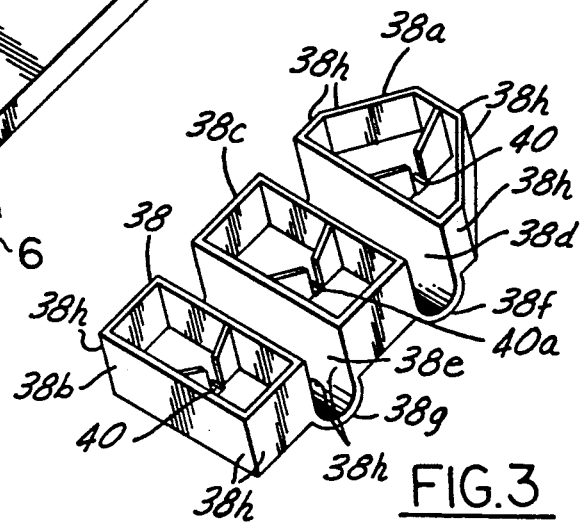
FIG. 3 is a perspective view of a connector member utilized in the handle extension according to the present invention, showing in particular the structure thereof which allows for an immovable, seatable fit with respect to the grip component of a coaster wagon.

As can be understood from reference to FIG. 3, the connector member 38, which is preferably constructed of plastic, has two opposing end portions 38a, 38b, each, respect a predetermined pattern defined by a respective edgewall 38h. Each predetermined pattern is shaped such as to abutably seat into the included space 28a, 28b, respectively, of one of the two preselected grip components 28', 28". For example, a first end portion 38a of the connector member 38 has an edgewall 38h arranged in a predetermined pattern so as to abutably seat within the included space 28a defined by the V-shaped bracket 30, and cylindrically shaped handle grip 30' of the first type 28' of grip component 28, while the opposite, second end portion 38b of the connector member has an edgewall 38h which is arranged in a predetermined pattern so as to abutably seat within the included space 28b defined by the U-shaped bracket 32" and the curvably shaped handle grip 30" of second type 28' of grip component. A spacer block 38c is provided which is spaced from the two end portions 38a, 38b, respectively, by bridges 38f, 38g so as to provide by the handle grips 30', 30" of the first and second types 28', 28" of grip component 28. Thus, as depicted in FIG. 2, the edgewall 38h of the first and second end portions 38a, 38b and the edgewall of the spacer block 38c abut the bracket 32 and hand grip 30 of the respectively seated grip component 28. It is preferred, but not required, that the first and second end portions and the spacer block be hollowed-out behind edgewall 38h, as shown in FIG. 3, in order to conserve material and component weight.

The connector member 38 is provided with three holes 40, one of which being a central hole 40a and the other two being located near opposite ends of the connector member. Depending on which end portion of the connector member 38 is appropriate for the particular grip component 28 of the coaster wagon 14 being used, the hole 40 thereof and the central hole 40a are aligned with two holes 42 on the extension member 36. A common fastener passes through each aligned hole so as to removably connect the connector member 38 to the extension member 36. The common fasteners are preferred to be in the form of stove bolts 44a and wing nuts 44b, and the holes 40 in the connector member 38 are preferred to be squared so as to engage the square base of the head of the stove bolts. Alternatively, the center hole 40a may not involve removal of the common fastener, but rather the connection block may rotate about this hole in order to bring one or the other end portion into the approximate orientation depicted in FIGS. 4 and 5.

FIG. 6 shows a preferred shape and construction of the extension member 36 and hand grip 34. The extension member 36 is planar, being thinly constructed of plastic having a predetermined width and periodic reinforcement ribbing 46 at stress points. Adjacent the hand grip 34, a gentle curve 48 and reduced width portion 50 of the extension member 36 combine so as to provide an off-set for the integrally formed hand grip so that a portion of the hand grip is more-or-less in alignment with the handle grip 28 of the coaster wagon handle 12.

In operation, the user will be using a coaster wagon having a handle with some particular shaped grip component. The user identifies the correct end portion of the connector member that resembles the shape of the space formed within the bracket and the handle grip of the grip component, and then positions the connector member so that the edgewall thereof seatably abuts the bracket and handle grip of the grip component (see FIGS. 4 and 5). Next, the holes in the connector member and the extension member are aligned and the threaded fasteners are placed therethrough and then fastened to the extension member thereby clamping the handle grip between the adjoining bridge and the extension member. In this configuration, as shown in FIG. 2, the handle of the coaster wagon projects away from the end of the extension member opposite the hand grip and is immovably connected with the extension member so as to provide control over the handle of the coaster wagon with respect to pulling, pushing and turning thereof. To remove the handle extension 10, the threaded fasteners are removed and the grip component is then removed from the connector member.

To those skilled in the art to which this invention appertains, the above described preferred embodiment may be subject to change or modification. For instance, other shapes of connector member, extension member and hand grip are possible, those shown herein being simply by way of preferred example. Further, the connector member may be configured to seat abutably with respect to grip components having included spaces of shapes other than those shown in the Drawing. Such change or modification can be carried out without departing from the scope of the invention, which is intended to be limited only by the scope of the appended claims.

What is claimed is:

1. A handle extension for a handle of a coaster wagon, the handle terminating in a grip component selected from a first grip component and a second grip component, wherein the first grip component is composed of a first handle grip and a first bracket, the first handle grip and the first bracket collectively forming an included space having a first predetermined pattern, wherein the second grip component is composed of a second handle grip and a second bracket, the second handle grip and a second bracket collectively forming an included space having a second predetermined pattern, said handle extension comprising:

an extension member having a first end and an opposite second end;

hand grip means connected with said first end of said extension member for providing a hand grip for a user of the coaster wagon; and connector means selectively connected with said second end of said extension member for selectively connecting the grip component of the coaster wagon immovably with respect to said extension member, said connector means comprising:

a connector member comprising:

a first end portion having an edgewall arranged in a pattern which at least substantially matches the first predetermined pattern;

a spacer block having an edgewall, mutually facing portions of said edgewall of said spacer block and of said edgewall of said first end portion being separated a first predetermined distance;

first bridge means for connecting said first end portion to said spacer block;

a second end portion located opposite said first end portion, said second end portion having an edgewall arranged in a pattern which at least substantially matches the second predetermined pattern, mutually facing portions of said edgewall of said spacer block and of said edgewall of said second end portion being separated a second predetermined distance; and second bridge means for connecting said second end portion to said spacer block and connecting means for selectively connecting said connector member to said extension member;

wherein the first grip component is connected to said handle extension by said edgewall of said first end portion being placed in the included space of the first grip component so as to at least substantially abut the first bracket and the first handle grip, the first handle grip being trapped between said first bridge means and said extension member when said connector means is connected with said extension member with said first end portion facing away from said hand grip means; and wherein the second grip component is connected to said handle extension by said edgewall of said second end portion being placed in the included space of the second grip component so as to at least substantially abut the second bracket and the second handle grip, the second handle grip being trapped between said second bridge means and said extension member when said connector means is connected with said extension member with said second end portion facing away from said hand grip means.

2. The handle extension of claim 1, wherein said extension member is of an elongated planar shape, said hand grip means being integrally connected with said extension member.

3. The handle extension of claim 2, wherein said elongated planar shape of said extension member defines a plane, wherein further said hand grip means comprises a hand grip projecting perpendicular to said extension member in said plane.

4. The handle extension of claim 3, wherein said hand grip is positioned relative to said extension member so that at least a portion thereof can be held by the user at a location in substantial axial alignment with the handle of the coaster wagon.

5. The handle extension of claim 4, wherein said mutually facing portions of said edgewall of said first end portion of said connector member and of said edgewall of said spacer block as well as said first bridge means collectively form a first handle grip socket which is dimensioned so as to clamp the first handle grip between said first bridge means and said extension member when said connector member is connected to said extension member; further wherein said mutually facing portions of said edgewall of said second end portion of said connector member and of said edgewall of said spacer block as well as said second bridge means collectively form a second handle grip socket which is dimensioned so as to clamp the second handle grip between said second bridge means and said extension member when said connector member is connected to said extension member.

6. The handle means of claim 5, wherein said connecting means for selectively connecting said connector member to said extension member comprises said extension member being provided with two holes that are mutually spaced apart a predetermined length, said connector member being provided with three holes, one hole of which being a central hole and the remaining two holes of said three holes of said connector member being separated from said central hole by said predetermined distance, and threaded fastener means selectively passing through said central hole and one other hole of said three holes of said connector member and also passing through said two holes of said extension member for holding together said extension member and said connector member.

* * * * *